Patented Aug. 28, 1934

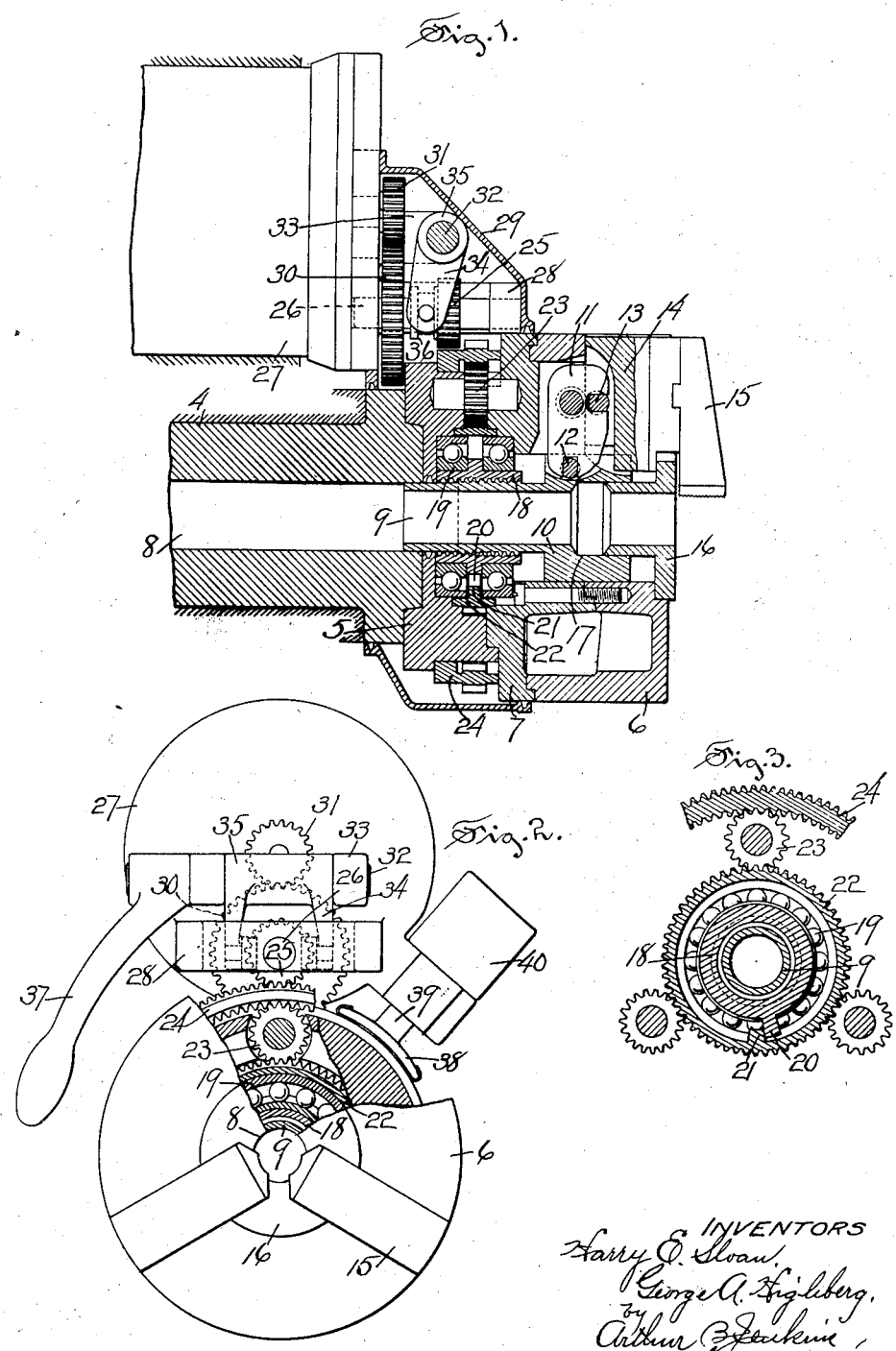

1,971,537

UNITED STATES PATENT OFFICE 1,971,537

CHUCK

Harry E. Sloan, Hartford, and George A. Highberg, West Hartford, Conn., assignors to The Cushman Chuck Company, Hartford, Conn., a corporation of Connecticut Application November 20, 1931, Serial No. 576,326

5 Claims. (Cl. 279—119)

Our invention relates to the class of devices which are employed for holding work for operation thereon of cutting tools of various sorts, such work commonly being rotated during the cutting operation, and an object of the invention, among others, is the production of a chuck embodying a compact arrangement of mechanism for mechanically closing and opening the chuck jaws for the purpose of grasping and releasing the work.

One form of a chuck embodying our invention and in the construction and use of which the objects herein set out, as well as others, may be attained is illustrated in the accompanying drawing, in which—

Figure 1 is a view in side elevation of a motor and of our improved chuck, the latter being cut in central longitudinal section.

Figure 2 is an end view with parts broken away to show construction and with the housing removed.

Figure 3 is a view in cross-section on a plane passing through the pinions meshing with the teeth on the inside of the driving gear ring, said pinions being shown in full.

In the accompanying drawing the numeral 4 indicates a spindle, one end only of which is shown, and which spindle may be mounted and rotated in a manner common to chucks of this class. The chuck is secured to the end of the spindle in any suitable manner the main part of the chuck being formed in three pieces, to wit, a back plate 5, a front plate 6 and an intermediate plate 7, all of which may be secured together as by means of screws extending through the several parts in a manner common to chuck construction. These three members will be referred to herein as the chuck body, said body being chambered to receive the several operating parts, a hole extending completely through the chuck body at the axis thereof and communicating with a hole 8 extending lengthwise through the spindle. A jaw actuator 9 is mounted for sliding movement in said holes through the spindle and chuck, said actuator having a head 10 at its outer end and said head having slots into which the ends of jaw actuating levers 11 extend. The levers 11 are pivotally mounted within the chuck body, as shown in Figure 1 of the drawing, said levers, three in number in the specific structure herein shown, each having a slot in one end engaging a pin 12 extending across a slot in the outer surface of the head, and another slot in its side edge engaging a pin 13 extending across a slot in the bottom of a jaw carrier 14. These jaw carriers are mounted in slots radially formed in the face of the chuck body and, in the structure herein shown, each carrier comprises a top part to which a chuck jaw 15 is secured in any suitable manner common to structures of this class.

A bushing 16 having its flanged outer end located in a recess in the front plate 6 extends into the central opening in the chuck body and into a counterbored opening 17 in the head 10, the bushing thereby serving to exclude foreign matter from working parts of the chuck.

The actuator 9 is threaded and an actuating sleeve 18 is internally threaded to fit the thread on the actuator, said sleeve being mounted in ball bearings 19 spaced apart and surrounding the central opening through the chuck body. The sleeve 18 has a tooth 20 projecting from one side for engagement by a tooth 21 projecting from the inner side of a gear ring 22 supported by the chuck body. The outer toothed edge of said ring meshes with the teeth of several pinions 23 rotatably mounted in and between the plates 5 and 7. Said pinions mesh with teeth internally formed on a driving gear ring 24 rotatably mounted on the outer surface of the back plate 5, and as shown in Figure 1 of the drawing. This driving gear ring has a row of teeth formed on its periphery adapted to be engaged by the teeth of a driving pinion 25 secured to a sliding sleeve. Said sleeve is splined to a shaft 26 secured at one end on the face plate of a motor 27 and at its opposite end in a bar 28 secured in a housing 29 attached to the motor and surrounding and enclosing the rear end of the chuck body, as shown in Figure 1 of the drawing. A gear 30 is secured to the shaft 26 and meshes with a pinion 31 secured to the projecting end of the motor shaft from within the motor 27.

A gear shifting shaft 32 is mounted upon lugs 33 projecting from the front plate of the motor casing hereinbefore referred to, said shaft having arms 34 projecting from a sleeve 35 mounted upon said shaft, said arms having pins engaging a groove in the sleeve 36 to which the pinion 25 is rigidly secured. This shifting mechanism is employed to mesh the pinion 25 with the teeth on the periphery of the driving gear ring 24, and to unmesh said teeth. A clutch handle 37 is secured to the shaft 32 as a means for shifting the pinion 25 for the purpose just described.

In the operation of the chuck the motor being active, a piece of work is placed between the chuck jaws 15 and the handle 37 is actuated to move the gear 25 into mesh with the teeth on the gear ring 24. A switch, not shown, is then operated to start the motor thereby causing the jaw actuator 9 to move to actuate the levers 11, thereby closing the jaws into contact with the work. The handle 37 is then actuated to unmesh the pinion 25 from the teeth of the ring 24. The operation upon the work being completed, the handle 37 is operated to mesh the teeth of the pinion 25 with the teeth of the gear ring 24. The motor being of the reversal type is actuated in opposite direction from that just described and the chuck jaws are thereby loosened from the work.

During the operation of the mechanism hereinbefore described for actuating the chuck jaws it is desirable that the chuck be held against rotation in order to permit the mechanism to efficiently act. For the purpose of holding the chuck a brake shoe 38 secured at the end of the core 39 of a solenoid 40 is employed, and any suitable means, as an electric switch, may be manually operated to energize the solenoid and press the brake shoe against the periphery of the chuck to hold it against rotation.

In the arrangement of the mechanism illustrated and described herein the motor is mounted upon the standards or supports for the spindle, and by the term "motor" as used herein is meant any device or mechanism by means of which power is employed for opening and closing the chuck jaws. Our improved arrangement enables the mechanism to be disposed in compact form with the power for opening and closing the jaws applied through the side of the chuck body. The spindle is therefore enabled to receive a rod of stock extended through the spindle, which is a desirable feature in structures of this class.

In accordance with the provisions of the patent statutes, we have described the principles of operation of our invention together with the device which we now consider to represent the best embodiment thereof; but we desire to have it understood that the device shown is only illustrative, and that the invention may be carried out by other means and applied to uses other than those above set out.

We claim:

1. A chuck including a body having jaws movably mounted thereon on opposite sides of a central opening therein, a spindle for operatively supporting said body, ball bearings spaced apart within said body, a threaded sleeve rotatably mounted within said ball bearings, an operative connection between said sleeve and jaws for operating the latter, a gear ring rotatably mounted within the central opening through the chuck body, an operative connection extending between said ball bearings to connect said ring with said sleeve, a motor supported adjacent to said body, and an operative connection between said motor and said ring.

2. A chuck including a body having jaws movably mounted thereon, a spindle for operatively supporting said body, a threaded actuating sleeve rotatably mounted within said body, ball bearings spaced apart and surrounding said sleeve to support it, a toothed ring mounted in the body surrounding said ball bearings, connecting teeth between said ring and sleeve and extending between said ball bearings, a pinion rotatably mounted in said body and engaged with said ring, a driving ring rotatably mounted on said body and having internal teeth meshing with said pinion, a motor located adjacent to said chuck, and motor driven mechanism including a pinion shiftable to engage the teeth on the outer side of said driving ring.

3. A chuck including a body having jaws movably mounted thereon, a spindle for operatively supporting said body, ball bearings spaced apart and supported within said body, a member rotatably mounted within and supported by said ball bearings, an operative connection between said member and said jaws for operating the latter, a member rotatably supported on the outer side of and surrounding said bearings, means for operating said last mentioned member, and a connection between said members for operating one by the other.

4. A chuck including a body having jaws movably mounted thereon, a rotatably mounted spindle to which said body is secured, a toothed jaw actuator rotatably mounted in said body and operatively connected with said jaws, a gear ring rotatably mounted in said body, ball bearings spaced apart and supporting said actuator on their inner surfaces and said gear ring on their outer surfaces, a toothed connection between said actuator and gear ring said connection extending between said ball bearings, a driving gear ring rotatably mounted on said body and operatively connected with said gear ring, a motor supported adjacent to said spindle, and driving mechanism operatively connecting said motor with said chuck and including a gear meshing with the teeth of said driving gear ring.

5. A chuck including a body having jaws movably mounted thereon, a spindle for operatively supporting said body, an annular supporting member within the body, an element rotatably mounted within and supported by said annular member, an operative connection between said element and said jaws for operating the latter, an element rotatably supported on the outer side of and surrounding the annular member, means for operating said last mentioned element and a connection between said elements for operating one by the other.

HARRY E. SLOAN.
GEORGE A. HIGHBERG.